United States Patent [19]
Watanabe et al.

[11] Patent Number: 5,539,583
[45] Date of Patent: Jul. 23, 1996

[54] LENS BARREL WITH ROTATION AMOUNT DETECTING ENCODER AND ASSSEMBLING METHOD THEREOF

[75] Inventors: Tsuneo Watanabe, Tokyo; Ryoichi Suganuma, Yokohama, both of Japan

[73] Assignee: Nikon Corporation, Japan

[21] Appl. No.: 381,158

[22] Filed: Jan. 31, 1995

[30] Foreign Application Priority Data

Feb. 1, 1994 [JP] Japan ................... 6-010650

[51] Int. Cl.[6] .................. G02B 15/14; G01D 5/34
[52] U.S. Cl. .................. 359/699; 359/701; 250/231.14; 250/231.18
[58] Field of Search .................. 359/699, 701, 359/704, 696, 694; 354/400, 402, 195.1, 195.12; 250/231.14, 231.18

[56] References Cited

U.S. PATENT DOCUMENTS

| | | | |
|---|---|---|---|
| 4,796,045 | 1/1989 | Hamanishi | 354/400 |
| 4,857,951 | 8/1989 | Nakajima | 354/400 |
| 5,036,348 | 7/1991 | Kusaka | 354/402 |
| 5,134,525 | 7/1992 | Kaneda | 359/697 |
| 5,196,880 | 5/1993 | Ishibashi | 354/400 |
| 5,278,601 | 1/1994 | Kawanami | 354/400 |
| 5,323,001 | 6/1994 | Igaki | 250/231.16 |

*Primary Examiner*—Georgia Y. Epps
*Assistant Examiner*—Ricky Mack

[57] ABSTRACT

A lens barrel has a fixed member, a rotating member for shifting an optical system with respect to the fixed member in a direction of an optical axis, and a rotation amount detecting encoder for detecting an amount of rotation of the rotating member with respect to the fixed member. The encoder has a first rotation detecting scale provided integrally on the rotating member, a second rotation detecting scale provided on the fixed member, a light emitting device provided on the fixed member and a light receiving device provided on the fixed member to receive light from the light emitting device through the first and second rotation detecting scales, wherein the rotating member can be set so as to rotate 360° or more.

10 Claims, 5 Drawing Sheets

LENS BARREL WITH ROTATION AMOUNT DETECTING ENCODER AND ASSSEMBLING METHOD THEREOF

BACKGROUND OF THE INVENTION

1. Field of the Invention

The present invention relates to a lens barrel equipped with a rotation amount detecting encoder such as a pulse encoder for detecting an amount of shift of a focusing lens group, etc., and an assembling method thereof.

2. Related Background Art

Conventionally, in this type of lens barrel, the adjustment of an encoder is performed with a cam ring, a lens barrel and the other peripheral accessories incorporated in a fixed cylinder, so that the rotation angle of the encoder formed integrally on the cam ring is limited to a certain angle (the rotation angle of the cam ring).

Therefore, in the conventional lens barrel, the duty adjustment of pulses of the encoder is performed while reversing the cam ring by means of a limiting member. Therefore, means or a tool for moving the cam ring is required to have a reverse function, which causes the means or the tool to be complex and expensive.

Also, as the cam ring is made to rotate at higher speed, the time for the duty adjustment during rotation of the cam ring in one direction is shortened, whereby the adjustment becomes difficult.

Further, when the readjustment of the encoder is required due to an accident after the completion of assembly of the lens barrel, it is necessary to disassemble the lens barrel until the encoder section is exposed, so the repair is troublesome.

SUMMARY OF THE INVENTION

It is an object of the present invention to provide a lens barrel and its assembling method in which an encoder can be adjusted easily by the use of a simple driving tool.

It is another object of the present invention to provide a lens barrel in which an encoder can be readjusted after the completion of assembly of the lens barrel without disassembling it.

A lens barrel of the present invention solves the above problems. For easy understanding, elements of the lens barrel are designated by reference numerals corresponding to a preferred embodiment, as shown in the drawings but not limited thereto.

According to a first solving means, in a lens barrel comprising a fixed member (1); a rotating member (3) for shifting an optical system with respect to the fixed member in a direction of an optical axis; and a rotation amount detecting encoder including a first rotation detecting scale (9) provided integrally on the rotating member, a second rotation detecting scale (10) provided on the fixed member, a light emitting device (11) provided on the fixed member and a light receiving device (12) provided on the fixed member to receive light from the light emitting device through the first and second rotation detecting scales, the rotating member can be set so as to rotate 360° or more.

According to a second solving means, in the lens barrel having the first solving means, the rotating member (3) is provided with a rotation limiting member (7, 8) for limiting a rotation range of the rotating member corresponding to an amount of shift of the optical system, and the rotation limiting member is removably mounted to the rotating member.

According to a third solving means, in the lens barrel having the first solving means or the second solving means, the rotating member has a transmitting section (3c) which receives rotational force for rotating the rotating member from the outside.

According to a fourth solving means, in the lens barrel having one of the first to third solving means, the rotating member is formed with the first rotation detecting scale having a ring shape and detection is possible in any rotating position.

According to a fifth solving means, in a lens barrel comprising a fixed member; a rotating member for shifting an optical system with respect to the fixed member in a direction of an optical axis; and a rotation amount detecting encoder having a first rotation detecting scale provided integrally on the rotating member, a second rotation detecting scale provided on the fixed member, a light emitting device provided on the fixed member and a light receiving device provided on the fixed member to receive light from the light emitting device through the first and second rotation detecting scales, an external member (16) is formed with an opening (16a) (as shown in FIG. 5) for adjustment in a radial direction of the second rotation detecting scale, the light emitting device and the light receiving device so as to expose the second rotation detecting scale, the light emitting device and the light receiving device partially or wholly to the outside of the lens barrel.

According to the present invention, as the rotating member can be set so as to rotate 360° or more, it is possible to adjust the encoder in a state where the rotating member is rotatably supported by the fixed member, prohibited from moving in a thrust direction with respect to the fixed member and allowed only to rotate. The rotating member has a rotating system and an interlocking section formed integrally and is rotated 360° or more by the adjusting tool. Thus, the encoder can be adjusted while rotating the rotating member 360° or more, so reverse rotation of the rotating member is unnecessary for the adjustment. As a result, the adjustment becomes easy and the structure of the adjusting tool is simplified.

Further, it is possible to adjust the encoder prior to incorporating a motor into the lens barrel, since rotational force from the outside can be transmitted to the rotating member via the transmitting section thereof.

Furthermore, an opening is formed in the external member provided on the outer peripheral side of the encoder section, so that it is possible to adjust the encoder after the lens barrel has been assembled.

DESCRIPTION OF THE PREFERRED EMBODIMENTS

Figure 1:
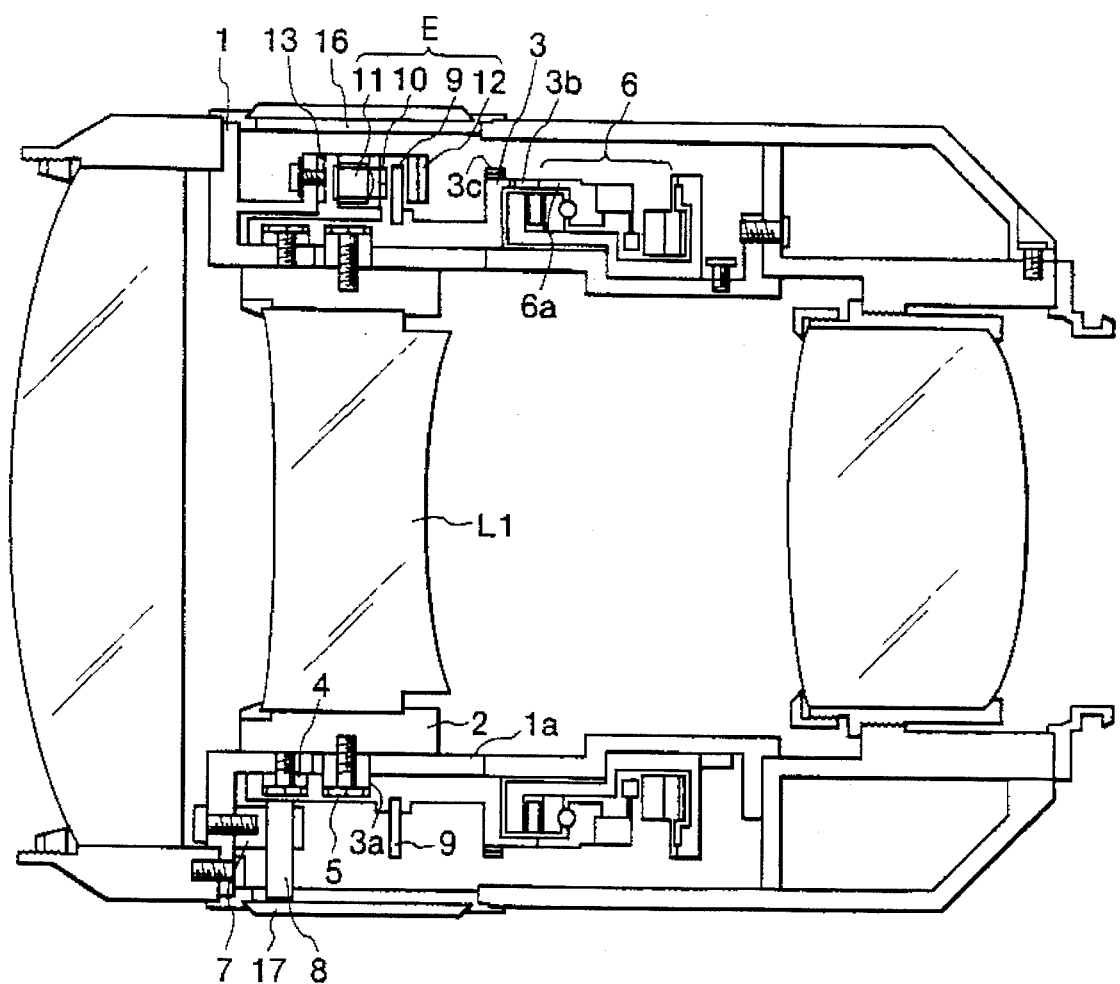
FIG. 1 is a sectional view of a lens barrel according to a preferred embodiment of the present invention.
Figure 2:
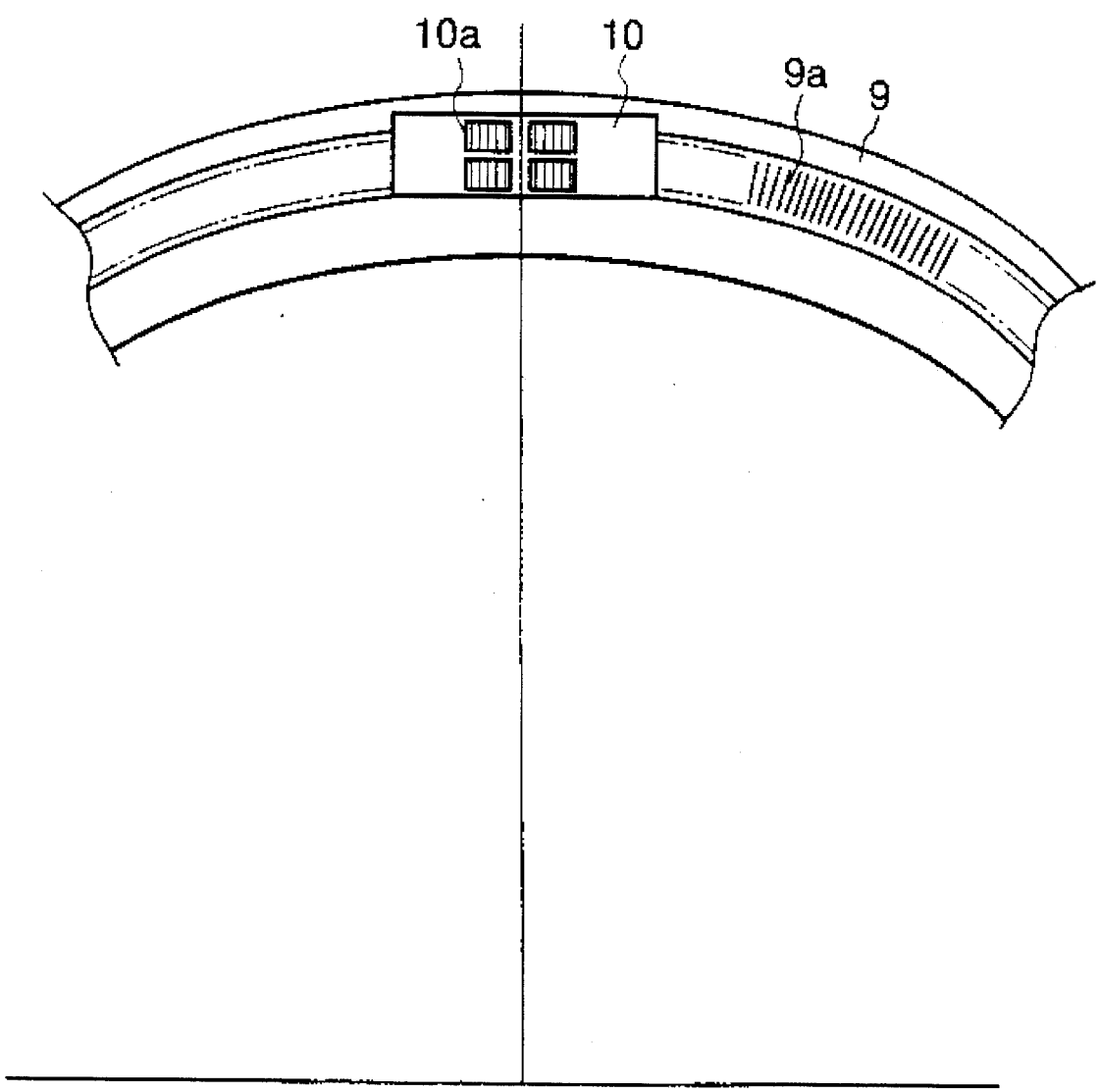
FIG. 2 is a diagram showing a portion of the encoder section of the lens barrel according to a preferred embodiment according to the present invention.

The present invention will be described in detail according to a preferred embodiment thereof with reference to the accompanying drawings. FIG. 1 is a sectional view of a lens barrel according to a preferred embodiment of the present invention and FIG. 2 is a diagram showing a portion of the encoder section of the lens barrel of a preferred embodiment according to the present invention.

As shown in FIG. 1, a lens holding frame 2 for holding a focusing lens group L1 is fitted on the inner surface of a fixed cylinder 1 and a cam ring 3 is fitted on the outer surface thereof.

The movement of the cam ring 3 in the optical axis direction is restricted by pins 4 provided on the fixed cylinder 1 and only rotation thereof is allowed. Also, pins 5 are provided on the lens holding frame 2 and fitted in rectilinear grooves 1a of the fixed cylinder 1 and lead grooves 3a of the cam ring 3. Therefore, the lens holding member 2 is shiftable in the optical axis direction for a focusing operation by rotating the cam ring 3.

Behind the cam ring 3 is disposed an ultrasonic motor 6 whose rotor 6a is engaged with a rear claw 3b of the cam ring 3. Therefore, the cam ring 3 can be rotated by the ultrasonic motor 6.

Two stoppers (rotation limiting members) 7 are secured to the fixed cylinder 1 by means of screws. The stoppers serve to limit a rotation range of the cam ring 3 corresponding to a predetermined amount of shift of the focusing lens group L1 in the optical axis direction and are provided on respective ends of the rotation range. The stoppers 7 are brought into engagement with a stopper pin 8 provided on the cam ring 3 thereby to limit rotation of the cam ring 3.

An encoder E includes a main scale 9, an index scale 10, a light emitting device 11 and a light receiving device 12. In this embodiment, the main scale 9 is provided on the cam ring 3. Accordingly, the encoder E generates pulses corresponding to an amount of rotation of the cam ring 3. By counting the number of pulses, the amount of rotation of the cam ring 3, i.e., the amount of shift of the focusing lens group L1 can be detected. Also, the rotational direction of the cam ring 3 can be detected by the phase difference between two-phase pulses.

As shown in FIG. 2, the main scale 9 is formed with a signal zone 9a in which light and dark stripes are drawn. The index scale 10 is provided with four windows 10a in which stripes having the same width as the stripes in the main scale 9 are drawn. The stripes are shifted ¼ pitch for each window. Therefore, when the main scale 9 is rotated, light and darkness appear alternately in each of the windows 10a of the index scale 10. The phase of the signal obtained from the light and darkness repetitions is shifted 90° for each window. The signals obtained from the light and darkness repetitions are converted by a circuit (not shown) into two-phase pulse signals. By the number of pulses and the phase difference between the two-phase pulse signals, the amount of rotation of the cam ring 3 and the rotational direction thereof can be detected.

Figure 3:
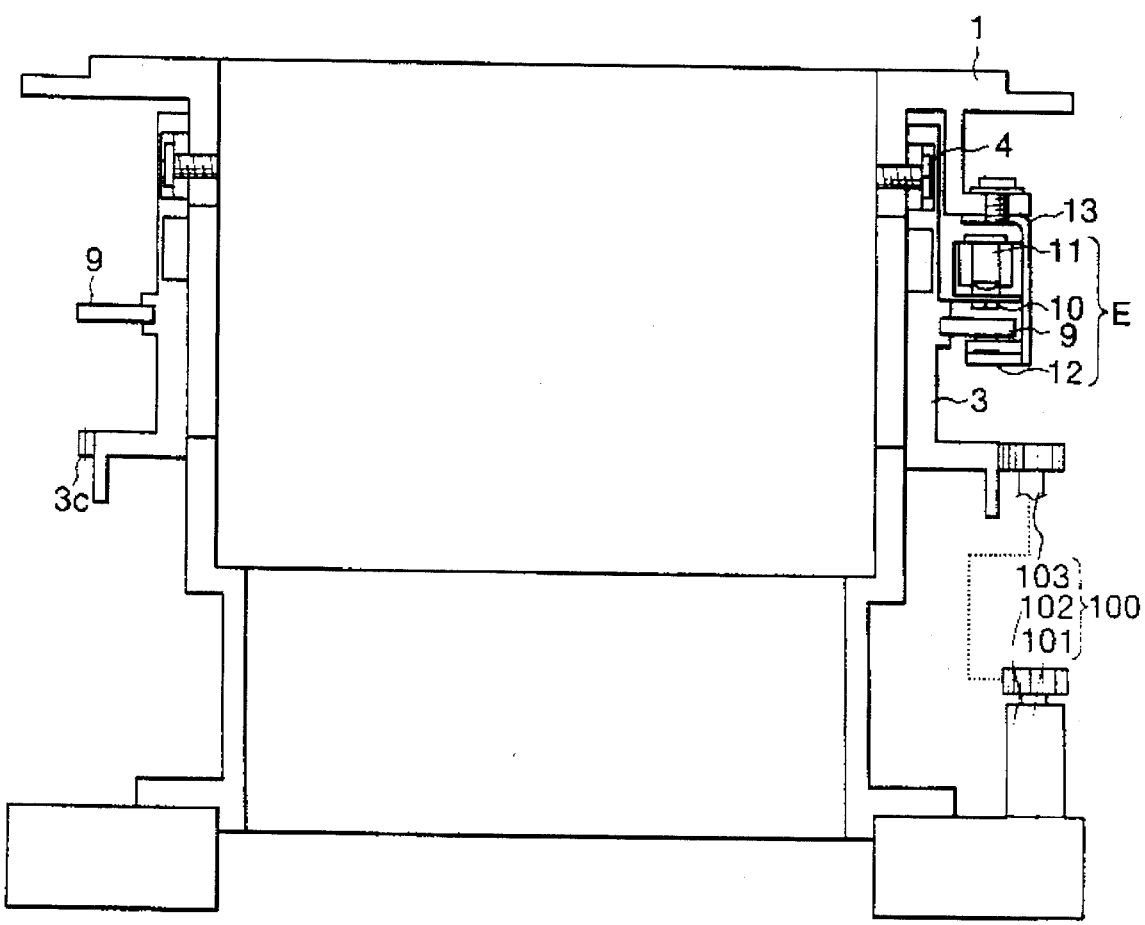
FIG. 3 shows a state in which the lens barrel of a preferred embodiment is mounted to an adjusting tool.
Figure 4:
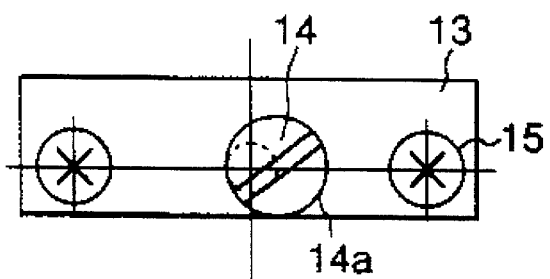
FIG. 4 shows an adjusting member of an encoder of the lens barrel of a preferred embodiment according to the present invention.

FIG. 3 shows the state in which the lens barrel of this embodiment is attached to an adjusting tool and FIG. 4 shows an adjusting member of the encoder. The adjustment of the encoder E means that the inclination of the stripes of the index scale 10 with respect to the stripes of the main scale 9 is adjusted, and this adjustment is performed as follows.

The encoder adjustment is performed during the process of assembly of the lens barrel and also performed after the cam ring 3 is fitted on the fixed cylinder 1 and the pins 4 are inserted, as shown in FIG. 3. At this time, the stoppers 7 and the lens holding frame 2 to be shifted in the optical axis direction are not incorporated, so the cam ring 3 can rotate more than 360° limitlessly.

If the stopper pin 8 is not incorporated, the stoppers 7 may be incorporated.

On the other hand, an encoder adjusting tool 100 includes a base 101 for securing the lens barrel thereto, a motor 102 for rotating the cam ring 3 and a gear train 103.

Also, a gear 3c is provided on the peripheral side of the cam ring 3 and when the lens barrel is attached to the adjusting tool 100, the gear train 103 of the adjusting tool 100 is meshed with the gear 3c of the cam ring 3. Therefore, when a motor 102 of the adjusting tool 100 is driven to rotate at a predetermined speed, the encoder E continues outputting pulse signals.

As shown in FIG. 4, the adjustment of the inclination of the stripes of the encoder E is performed by inclining the index scale 10, i.e., a holding member 13 thereof by means of an eccentric pin 14. Since the encoder E continues outputting the pulse signals, the eccentric pin 14 is rotated while observing the pulse waveforms. Then, when the phase difference between the two-phase pulse signals becomes a predetermined value, machine screws 15 are tightened to complete the adjustment of the encoder E. Thereafter, returning to the assembling process of the lens barrel, the lens barrel is assembled.

In this embodiment, the connection of rotation of the adjusting tool 100 and the cam ring 3 is carried out by means of the gears, but not limited thereto and a key system, a belt system, etc. may be adopted. Also, depending on an assembling process, the cam ring 3 may be driven by the ultrasonic motor 6 housed in the lens barrel.

Next, a case in which the readjustment of the encoder is required due to an unexpected accident after the completion of assembly of the lens barrel will be described.

Figure 5:
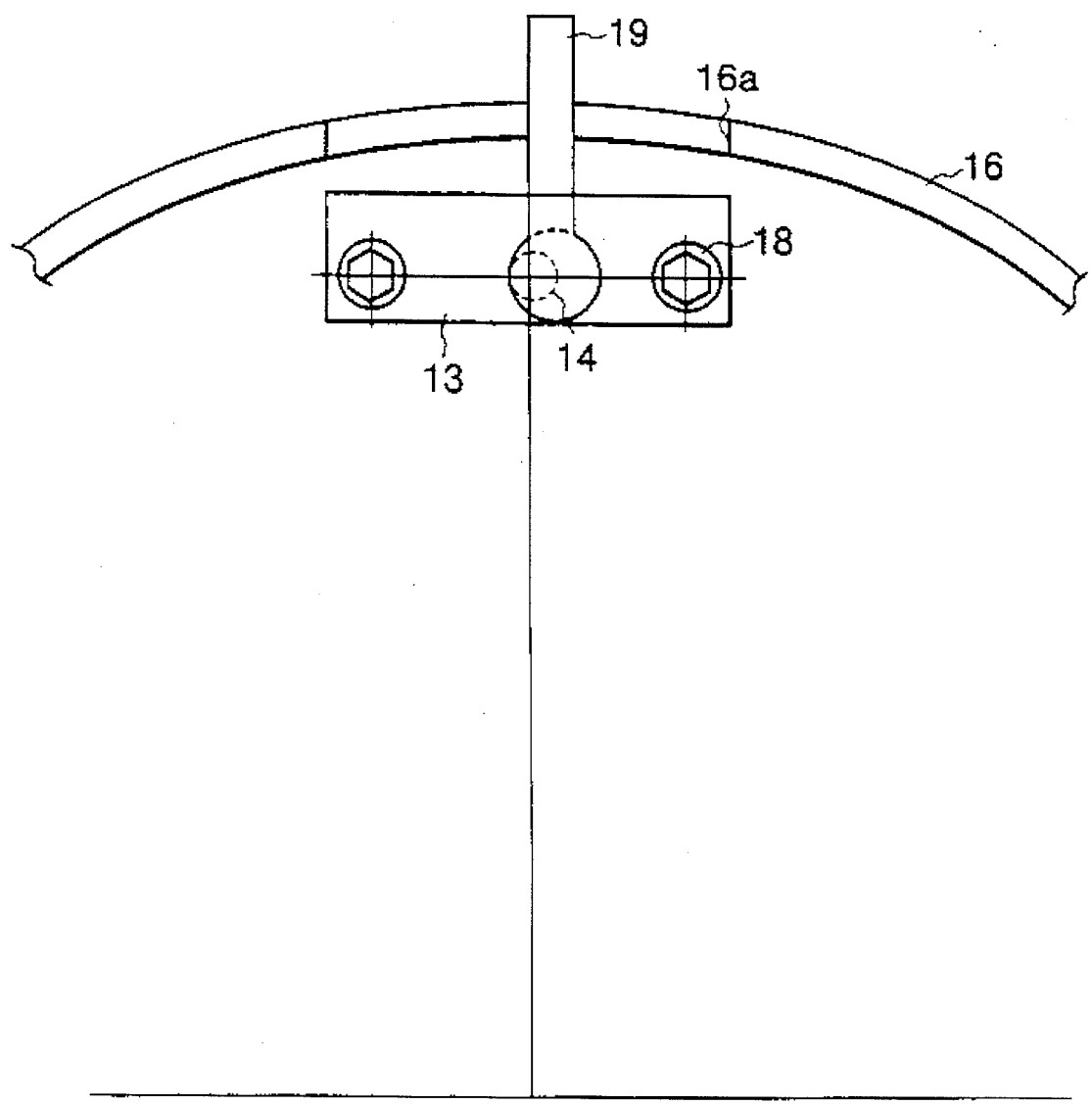
FIG. 5 shows another adjusting member of the encoder of the lens barrel of a preferred embodiment according to the present invention.

FIG. 5 shows another adjusting member of the lens barrel in a preferred embodiment according to the present invention. As shown in FIG. 1, an external member 16 (for instance, a manual focusing ring) is disposed on the outer peripheral side of the encoder E and a window 16a (as shown in FIG. 5) is provided directly over the encoder E. Usually, the window 16a is covered by a rubber ring 17 (as shown in FIG. 1).

Referring to FIG. 5, the holding member 13 of the encoder E is fastened by hexagon socket head cap screws 18 and can be loosened by inserting an L-shaped tool (not shown) through the window 16a.

Also, the eccentric pin 14 of the holding member 13 is provided with an eccentric pin portion 14a (see FIG. 4), and the inclination of the holding member 13 can be adjusted by inserting a lever-like adjusting tool 19 from the window 16a. After this adjustment, the hexagon socket head cap screws 18 are tightened.

According to this structure, the encoder can be adjusted without disassembling the lens barrel.

In this embodiment, although the window 16a for the adjustment is provided in the external member 16 (for instance, a manual focus ring), a window may be provided in an external fixed cylinder (i.e., a non-movable cylinder, unlike a manual focus ring) and covered by another member.

According to the present invention, with the cam ring made rotatable 360° or more, the encoder is adjusted while the output signals from the encoder area are observed constantly, so that the adjustment becomes easy. Also, it is not necessary to rotate the adjusting tool reversely, and what is necessary is only to control the rotation speed of the adjusting tool. Therefore, the adjusting tool can be simplified.

Further, since the opening for adjustment is formed in the external member in the vicinity of the encoder, the encoder can be readjusted without disassembling the lens barrel.

What is claimed is:

1. A lens barrel comprising:

a fixed member;

a rotating member for shifting an optical system with respect to said fixed member in a direction of an optical axis; and a rotation amount detecting encoder for detecting an amount of rotation of said rotating member with respect to said fixed member, said encoder having a first rotation detecting scale provided integrally on said rotating member, a second rotation detecting scale provided on said fixed member, a light emitting device provided on said fixed member and a light receiving device provided on said fixed member to receive light from said light emitting device through said first and second rotation detecting scales, wherein said rotating member is rotatable for 360° or more.

2. A lens barrel according to claim 1, wherein said rotating member is provided with a rotation limiting member for limiting a rotation range of said rotating member corresponding to a predetermined shift range of said optical system in the optical axis direction, said rotation limiting member being removably mounted to said rotating member.

3. A lens barrel according to claim 1, wherein said rotating member has a transmitting section which receives rotational force for rotating said rotating member from the outside.

4. A lens barrel according to claim 1, wherein said first rotation detecting scale is in the shape of a ring.

5. A lens barrel comprising:

a fixed member;

a rotating member for shifting an optical system with respect to said fixed member in a direction of an optical axis;

a rotation amount detecting encoder for detecting an amount of rotation of said rotating member with respect to said fixed member, said encoder having a first rotation detecting scale provided integrally on said rotating member, a second rotation detecting scale provided on said fixed member, a light emitting device provided on said fixed member and a light receiving device provided on said fixed member to receive light from said light emitting device through said first and second rotation detecting scales; and an external member formed with an opening for adjustment in a radial direction of said second rotation detecting scale, said light emitting device and said light receiving device so as to expose said second rotation detecting scale, said light emitting device and said light receiving device partially or wholly to the outside of said lens barrel.

6. A lens barrel comprising:

an optical system;

a fixed member for supporting said optical system shiftably in a direction of an optical axis;

a rotating member supported rotatably by said fixed member;

a cam member for shifting said optical system in the optical axis direction in accordance with rotation of said rotating member;

drive means for rotating said rotating member, said rotating member having a first transmitting section for receiving drive force from said drive means and a second transmitting section for receiving another force so as to rotate said rotating member;

a rotation amount detecting encoder for detecting an amount of rotation of said rotating member with respect to said fixed member, said encoder having a first rotation detecting scale provided integrally on said rotating member, a second rotation detecting scale provided on said fixed member, a light emitting device provided on said fixed member and a light receiving device provided on said fixed member to receive light from said light emitting device through said first and second rotation detecting scales;

adjusting means for adjusting a fixed position of said second rotation detecting scale with respect to said fixed member so as to adjust a relative positional relationship between said first and second rotation detecting scales; and a limiting member for limiting a rotation range of said rotating member so as to make said optical system shiftable for a predetermined distance in the optical axis direction, said limiting member being mounted removably to said lens barrel.

7. A lens barrel according to claim 6, further comprising an external member and an opening provided in said external member so as to adjust said adjusting means from the outside of said lens barrel.

8. A lens barrel according to claim 6, wherein said first rotation detecting scale is provided over the whole circumference of said rotating member.

9. A method of assembling a lens barrel, comprising:

the step of securing a lens barrel subassembly to an encoder adjusting tool, said lens barrel subassembly having a fixed member for supporting an optical system; a rotating member rotatably supported by said fixed member; an encoder for detecting an amount of rotation of said rotating member with respect to said fixed member, said encoder having a first rotation detecting scale provided integrally on said rotating member, a second rotation detecting scale provided on said fixed member, a light emitting device provided on said fixed member and a light receiving device provided on said fixed member to receive light from said light emitting device through said first and second rotation detecting scales, and adjusting means for adjusting a fixed position of said second rotation detecting scale with respect to said fixed member so as to adjust a relative positional relationship between said first and second rotation detecting scales, said encoder adjusting tool having securing means for securing said lens barrel subassembly and drive means for rotating said rotating member;

the step of rotating said rotating member by means of said drive means only in one direction;

the step of receiving signals from said encoder;

the step of adjusting said adjusting means based on the signals; and the step of mounting a limiting member for limiting a rotation range of said rotating member to said lens barrel subassembly after said adjusting step.

10. A lens barrel comprising:

a fixed member;

a rotating member rotatable with respect to said fixed member, shifting an optical system along an optical axis; and, a rotation amount detecting encoder detecting an amount of rotation of said rotating member, said encoder having a first rotation detecting scale provided on said rotating member, a second rotation detecting scale provided on said fixed member, a light source, and a light receiving device, wherein light is projected from the light source through the first and second scales onto the light receiving device.

* * * * *